(12) United States Patent
Edelson et al.

(10) Patent No.: US 8,186,038 B2
(45) Date of Patent: May 29, 2012

(54) METHOD FOR BUILDING A COMPONENT OF AN ELECTRICAL ROTATING MACHINE

(75) Inventors: Jonathan Sidney Edelson, Portland, OR (US); Maynard Leo Stangeland, Thousand Oaks, CA (US); Donald Henry Morris, Thousand Oaks, CA (US); Robert Lincoln Carman, Jr., Thousand Oaks, CA (US)

(73) Assignee: Borealis Technical Limited (GI)

( * ) Notice: Subject to any disclaimer, the term of this patent is extended or adjusted under 35 U.S.C. 154(b) by 731 days.

(21) Appl. No.: 11/991,672

(22) PCT Filed: Sep. 6, 2006

(86) PCT No.: PCT/US2006/034778
§ 371 (c)(1),
(2), (4) Date: Mar. 6, 2008

(87) PCT Pub. No.: WO2007/030572
PCT Pub. Date: Mar. 15, 2007

(65) Prior Publication Data
US 2009/0121560 A1    May 14, 2009

Related U.S. Application Data

(60) Provisional application No. 60/714,728, filed on Sep. 6, 2005.

(51) Int. Cl.
*H02K 15/00*    (2006.01)

(52) U.S. Cl. ............................... 29/596; 29/598; 29/825
(58) Field of Classification Search ............... 29/596, 29/598, 599, 825; 310/44, 211, 808; 336/83, 336/200
See application file for complete search history.

(56) References Cited

U.S. PATENT DOCUMENTS

| | | | | |
|---|---|---|---|---|
| 5,800,636 | A  * | 9/1998 | Tsukada et al. | 148/306 |
| 6,342,108 | B1 * | 1/2002 | Lashmore et al. | 148/306 |
| 6,362,716 | B1 * | 3/2002 | Anbo et al. | 336/200 |
| 2005/0016658 | A1 * | 1/2005 | Asokan et al. | 156/53 |
| 2006/0048854 | A1 * | 3/2006 | Kobayashi et al. | 148/98 |

* cited by examiner

*Primary Examiner* — Thiem Phan (57) ABSTRACT

A method for building a component for an electrical rotating machine is provided. The method includes providing a powdered magnetic material and an electrically conductive material, positioning these materials within a mold selected to produce the required dimensions in the materials after the application of a hot isostatic pressing (HIP) procedure, and applying at least one HIP procedure to the materials in the mold. Temperatures and pressures of the process are chosen to ensure that the electrically conducting and magnetic portions of the component are bonded without the materials seeping into each other. The method may be employed to build small compact motor systems using motor components formed as described to produce uniform grain structure and consistent magnetic and structural properties in the motor components that are useful in vehicle drive wheels.

20 Claims, 6 Drawing Sheets

METHOD FOR BUILDING A COMPONENT OF AN ELECTRICAL ROTATING MACHINE

CROSS-REFERENCE TO RELATED APPLICATIONS

This application is the U.S. national stage application of International Application No. PCT/US2006/032778, filed Sep. 6, 2006, which international application was published on Mar. 15, 2007, as International Publication WO2007/030572 in the English language. The International Application claims the benefit of U.S. Provisional Patent Application No. 60/714,728, filed Sep. 6, 2005. The above-mentioned patent applications are herein incorporated in their entirety by reference.

TECHNICAL FIELD

The present invention relates to a method for producing parts for electrical rotating machines using pressed powder.

BACKGROUND ART

Stators and rotors for electrical rotating machines are commonly produced by softening bulk metal and then shaping it. Softening may be done with heating while shaping may be done with a number of methods, including stamping, laminating, and annealing. These methods enable the motor to be precisely shaped. Electrical rotating machines may be mass-produced, since the methods are easily repeatable.

In conventional spindle motors, stators and rotors have been made by lamination. In this method, thin sheets of metal—called lamination stock—are cut into shapes by stamping, laser cutting, or equivalent techniques. The lamination stock may include a thin insulating material, possibly augmented after stamping. The stamped pieces of sheet metal are called laminations, and these are stacked to form the rotor or the stator.

When a stator is formed, the laminations are generally circular. If the completed stator is to have poles extending from its inner or outer surface, the circular laminations include protrusions which form the poles when stacked. Wire is then wound around the poles to form stator windings. When a rotor is formed, holes are left in the lamination stack for the various components, such as wires and rotor bars. The central shaft is pressed into the lamination stack, and the rotor bars pressed or cast into the edges.

The conventional method of forming motor components has a number of drawbacks. First, most steel is manufactured in rolled sheets and thus has a grain orientation. The grain orientation has an effect on the magnetic flux properties of the steel. In a circular stamped piece of steel cut from a sheet with a grain orientation, the grain orientation will be aligned with one diameter of the circle, transverse to the perpendicular diameter of the circle, and at varying angles with the other diameters of the circle. The inconsistent alignment of the grain structure around the circle causes magnetic flux values to differ in parts of the component and thus the motor does not have consistent and uniform torque properties as it rotates. The problem of grain alignment consistency may be eliminated, at a cost, by appropriate annealing and forming techniques, or by stacking the laminations in such a way that grain orientation is evenly distributed around the stator or rotor.

Another drawback with using circular steel pieces is that, especially for inward facing poles, it is difficult to wind the wire windings tightly because of the cramped space inside of the laminated stator body. The need for adequate working space creates a lower limit on the size of the stator and thus the motor. The limited working space also results in a low packing density of wire. The packing density of wire coiled around the poles affects the amount of power generated by the motor. Increasing packing density increases the power and thus the efficiency of the spindle motor.

An important factor in motor design is to reduce stack-up tolerances in the motor. Stack-up tolerances reduce the overall dimensional consistency between the components. Stack-up tolerances refer to the sum of the variation of all the tolerances of all the parts, as well as the overall tolerance that relates to the alignment of the parts relative to one another. One source of stack up tolerances is from the circular stator body. Generally, the thickness of rolled sheet steel is not uniform across the width of the sheet. Sometimes the edges are thicker or thinner than the center. In a stator made from circular stamped pieces, the thicknesses of individual laminations are thus different from one side to the other. When stacked together, this creates a stack up tolerance problem. Furthermore, the circular stampings leave a lot of wasted steel that is removed and must be recycled or discarded.

U.S. Pat. No. 5,672,927 to Viskochil discloses a spindle motor having an overmolded stator. One drawback with the overmold used in this patent is that it has a different coefficient of linear thermal expansion ("CLTE") than the corresponding metal parts to which it is attached. Another drawback with the overmold is that it is not very effective at dissipating heat. Further, the overmolds shown in this patent are not effective in damping some vibrations generated by energizing the stator windings.

U.S. Pat. No. 5,806,169 to Trago discloses a method of fabricating an injection molded motor assembly. However, the motor disclosed in Trago is a step motor, not a high torque induction motor. Furthermore, neither Viskochil nor Trago addresses the problem of variations in the thickness of steel used to make stator cores and the non-uniform grain structure in the steel causing variable magnetic flux in the stator during operation of the motor.

U.S. Pat. No. 6,892,439 to Neal et al discloses a motor including a stator having multiple conductors that create a plurality of magnetic fields when electrical current is conducted through the conductors. The stator has a pair of opposing end surfaces in contact with each other forming a toroidal core. A monolithic body of phase change material substantially encapsulates the conductors and holds the toroidal core in place. The stator is formed by laminating strips together to form a linear core preform, winding wire around poles extending from a side of the core preform, then rolling the preform to bring its two ends together to form the toroidal core.

In order to produce a motor permitting extremely high torque, it is desirable to create the magnetic sections of the motor with a material that improves upon the magnetic properties of pure iron. One solution is to melt two materials and subsequently combine them. This adds significantly to the time and cost of manufacture and the components may not blend satisfactorily. Another solution is to place two materials adjacent to one another. However, since the materials are not combined, the properties of each material are not present in the position of the other material. An alloy may be used, but alloys with high magnetic permeability are commonly too soft to be built into a strong motor as laminations.

A need exists for an improved high torque motor, overcoming the aforementioned problems of grain structure inconsistency, stack-up tolerances, and waste of material. In addition, there is a need for a method of producing a motor that works both with conventional silicon steel and with softer alloys having higher magnetic permeability.

The hot isostatic pressing (HIP) process, which subjects a component to elevated temperatures and pressures to eliminate internal microshrinkage, has enabled engineers to design components so they could meet specifications for use in critical, highly stressed applications.

The HIP process provides a method for producing components from diverse powdered materials, including metals and ceramics. During the manufacturing process, a powder consisting of one or more components is placed in a container, typically a steel can. The container is subjected to elevated temperature and a very high vacuum to remove air and moisture from the powder. The powder in the container is then subjected to high temperature and high pressure, the latter achieved by injecting high-pressure inert gas through an opening in the container. This process results in the removal of internal voids and creates a strong metallurgical bond throughout the material. The result is a clean homogeneous material with a uniformly fine grain size and a near 100% density. Typical approaches are disclosed in U.S. Pat. No. 6,210,633 and U.S. Patent Appl. Pub. No. 2004/0081572.

Motor components made of powdered material are known in the art. U.S. Pat. No. 6,956,307 to Engquist, et al. discloses motor stators formed in components by powder metallurgy and then assembled. U.S. Pat. No. 6,300,702 to Jack, et al. discloses a stator made of magnetic powder material and U.S. Pat. No. 6,651,309 to Gay et al. discloses a stator core made from magnetic powder material for use in alternating current generators and electric motors. U.S. Pat. No. 6,952,065 to Park, et al. discloses a laminated stator with poles formed by powder metallurgy. U.S. Pat. Nos. 6,811,887 and 6,432,554 to Barber, et al. discloses a system and method where powdered material is placed within a container along with an insulated coil which, when energized, subjects the powdered material to dynamic magnetic compaction and forms it into an electrical component. U.S. Pat. Nos. 5,982,073, 6,129,790, 6,251,514, 6,309,748, 6,340,397 and 6,342,108 to Lashmore, et al. disclose composition of a ferromagnetic powder for forming soft magnetic parts. U.S. Pat. No. 6,117,205 to Krause et al. discloses corrosion-resistant, soft magnetic metal components manufactured by powder metallurgy and infiltration processes.

Advantages of materials produced by HIP include reduced porosity, which enables materials with improved mechanical properties and increased workability to be produced. The HIP process eliminates internal voids and creates clean, firm bonds and fine, uniform microstructures. These characteristics are not possible with welding or casting. The virtual elimination of internal voids enhances the performance of the part produced by this technique and improves fatigue strength. The process also results in significantly improved non-destructive examination ratings.

A further advantage of the HIP process is its ability to create near-net shapes that require little machining. Conventional manufacturing methods use only 10-30% of the material purchased in the final product; the rest is removed during machining. A HIP'ed near-net shape part typically uses 80-90% of the purchased material. As a result, machining time and costs are significantly reduced. The strong combination of improved raw material use and greater machining efficiency that results from the HIP process has driven the growth of HIP'ed powder metal parts manufactured from nickel-based and titanium-alloys.

HIP has been applied to a number of industries, including automotive (turbocharger wheels and diesel engine valve lifters), medical (prosthetic devices), petroleum (valve bodies) and chemical processing.

DISCLOSURE OF INVENTION

From the foregoing, it may be appreciated that a need has arisen for a motor with a magnetic portion having extremely high magnetic permeability and hence allowing high torque. The present invention provides a method for building a component for an electrical rotating machine and comprises: providing powdered magnetic material; providing electrically conductive material; positioning the powdered magnetic material and the electrically conductive material within a mold functional to provide the materials with the required dimensions after application of a hot isostatic pressing (HIP) procedure; and applying at least one HIP procedure to the materials in the mold. Temperatures and pressures of the process are chosen to ensure that the electrically conducting and magnetic portions of the component are bonded without the materials seeping into each other.

In one aspect the present invention thus provides a method for building small compact motor systems using motor components formed from pressed powder. A technical advantage of this approach is that the component has uniform grain structure and thus consistent magnetic and structural properties. The motor may be located inside a vehicle drive wheel, as it is equipped to be a drive motor providing the necessary torque with reasonable system mass.

In further aspects of the invention, the motor systems of the invention may utilize polyphase electric motors, and are preferably connected to appropriate drive systems via mesh connections, to provide variable V/Hz ratios.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

In the following, the present invention is disclosed in relation to parts fabricated for an electric motor. It is to be understood however that the invention may be applied to other electric rotating machines, particularly to generators.

The present invention thus provides a method for forming a component of an electrical rotating machine comprising portions made of at least two different materials. The component may be either a rotor or a stator, and maybe be for use in either a motor or a generator. The two portions of the rotor or the stator are the electrically conducting portion and the magnetic portion. A specially designed HIP process is used to form the portion made of one material while simultaneously bonding it to the portion made of the other material. The magnetic portion is formed by HIP from a powdered magnetic material such as iron or magnetic alloy. The electrically conductive portion is made of an electrically conductive material such as copper, silver, or aluminum. The electric portion may be made by conventional machine shop practice or, in an alternative embodiment, the electric portion may also be formed from powder as described below.

The components of the magnetic alloy are chosen based on superior magnetic properties; other applications weigh magnetic properties relative to the weight and strength of the finished product. In addition to iron, the constituent materials of the alloy include, amongst others, cobalt, vanadium, niobium, manganese, chromium, nickel, silicon and carbon.

In one aspect the present invention is directed to producing a compact high torque motor. In certain applications, for example aircraft and spacecraft, it is advantageous to limit a motor's size and weight. In order to produce high torque while maintaining compact motor dimensions, a motor is designed in which its magnetic portions are formed from uniquely selected material having high magnetic permeability. Additionally, one or more components of the motor are produced by HIP or other powder metallurgy methods. The powder used to form a motor component includes particles of a metal or alloy. In addition, the method may be used to make motor components having adjacent sections made of different materials. Due to the production method, the adjacent sections are bonded together with a strong tensile bond. The material or materials used are chosen based on a number of factors including tensile strength, magnetic permeability, high temperature operation, and mass.

The alloy used for the rotor, stator or both, is a magnetic alloy such as Hiperco®, produced by Carpenter Technology Corporation. In a particularly preferred embodiment, the magnetic alloy is an iron-cobalt-vanadium alloy. An example of this alloy is Hiperco® 50, which is a soft magnetic alloy with a saturation flux density of 24 Kilogauss (2.4 T) and high magnetic permeability. In addition to iron, Hiperco® 50 includes cobalt (48.75%); vanadium (1.90%); silicon (0.05%); niobium (0.05%); manganese (0.05%); and carbon (0.01%). In addition to its magnetic properties, an iron-cobalt-vanadium alloy is characterized by high tensile strength.

Another material may be chosen based on the characteristics required for the current operation. Another embodiment uses an iron-cobalt-chromium alloy, such as Hiperco® 27, which has slightly lower magnetic permeability and saturation flux density than an iron-cobalt-vanadium alloy but is less brittle. In addition to iron, Hiperco® 27 includes cobalt (27.00%); chromium (0.60%); 0.60% nickel; 0.25% silicon; 0.25% manganese; and 0.01% carbon.

As the conventional HIP temperature for a magnetic alloy—the HIP temperature for Hiperco® is around 1950° F. (1066° C.)—is close to the melting point of copper (1984° F., 1085° C.). Therefore, direct application of a conventional HIP cycle may lead to infiltration of copper into the magnetic alloy, resulting in a vast transition zone between electric and magnetic sections of the component. To avoid this, in a further preferred embodiment, HIP is performed two or more times at different temperatures. As powder alloys, due to their fine grain size, will creep and densify at lower temperatures than this, a lower-temperature HIP cycle is applied at first, during which the bulk of the powdered magnetic material is internally bonded and formed into a structure. Temperature, pressure, and time parameters are chosen for this first HIP stage such that the copper or other conductive material does not melt and seep between the grains of the magnetic material as it solidifies. For the second HIP stage, parameters—generally including a higher temperature—are chosen such that any remaining gaps are removed from the structure and a good bond is formed between the magnetic material and the electrically conductive material.

Evaluation was done on products of a two-stage HIP procedure performed on Hiperco® 27 powder held adjacent to copper bars, with the first two-hour stage at 1670 degrees Fahrenheit (910 degrees Celsius) and 15 ksi (100 MPa) and the second two-hour stage at 1870° F. (1021° C.) and 15 ksi (100 MPa).

The micro-structure of Hiperco® 27 formed by the two-stage process was found to have achieved 100% density. Evaluation after the 2 hour creep densification at 1670° F. (910° C.) showed about 2-3% porosity, confirming that Hiperco® 27 was not yet fully consolidated at this stage. However, this porosity was low enough and closed—pores were not inter-connected—so that no copper infiltration occurred at the copper-Hiperco® 27 interface. Evaluation of the micro-structure after the second densification cycle at 1870° F. (1021° C.) showed that 100% density had been achieved and that minimal infiltration had occurred between copper and Hiperco® 27 portions.

When bimetallic products of the two-stage HIP process were subjected to high mechanical tension, fracture eventually occurred in the copper area, away from the area of Hiperco®-copper bond, showing that the tensile strength of the bond formed between Hiperco® 27 and copper was stronger than the tensile strength of copper itself. Hiperco® 27 powder particles indent during HIP into the surface of copper, destroying surface oxide films and building additional strength due to a kind of a "mechanical lock" at the interface.

The electrical rotating machine may be any type of motor or generator, and the component produced by powder metallurgy may be the stator, the rotor, or both. The stator may be internal to or external to the rotor. These, and further aspects of the invention may be better understood by referring to the Drawings and the following description thereof.

Figure 1A:
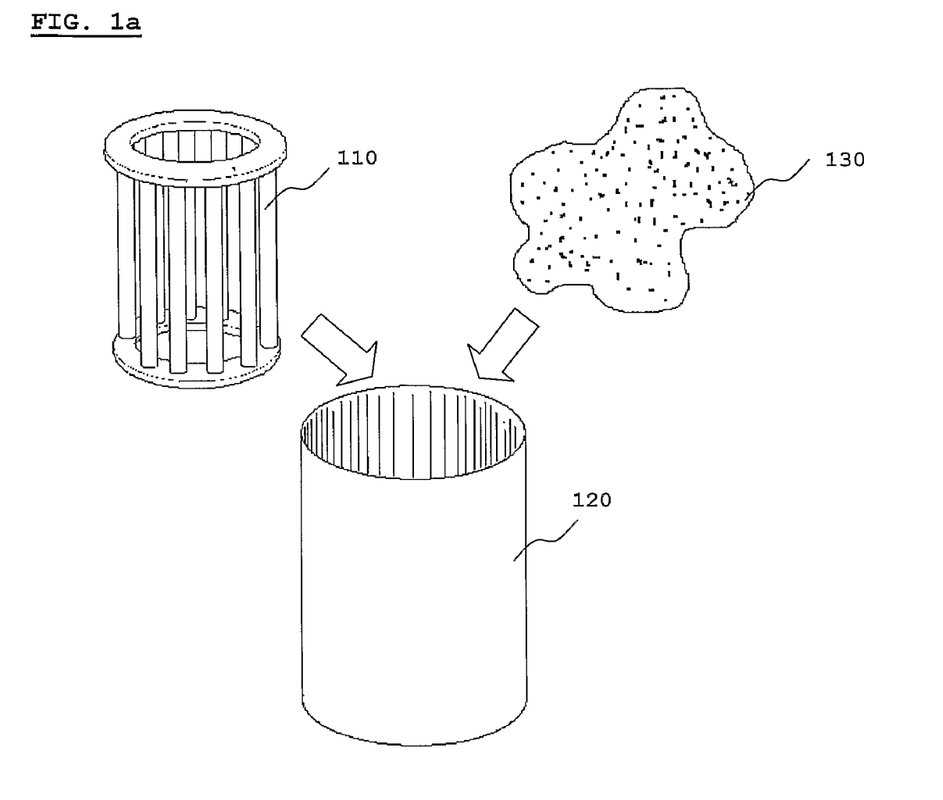
FIGS. 1a-1b are a simplified illustration of a method of producing a rotor in accordance with a preferred embodiment of the current invention.

In a preferred embodiment of the present invention, a squirrel-cage rotor is produced by the HIP process. Referring now to FIG. 1a, a copper cage 110 is provided. Cage 110 consists of copper bars and copper end rings and is assembled by conventional machine shop practice. A suitably shaped mold 120 is provided. Mold 120 comprises conventional steel support components, which may include a shaft to serve as an output shaft to connect the rotor to a load. The assembled cage 110 is placed into mold 120. A powdered magnetic material 130 is provided and added to mold 120.

Figure 1B:
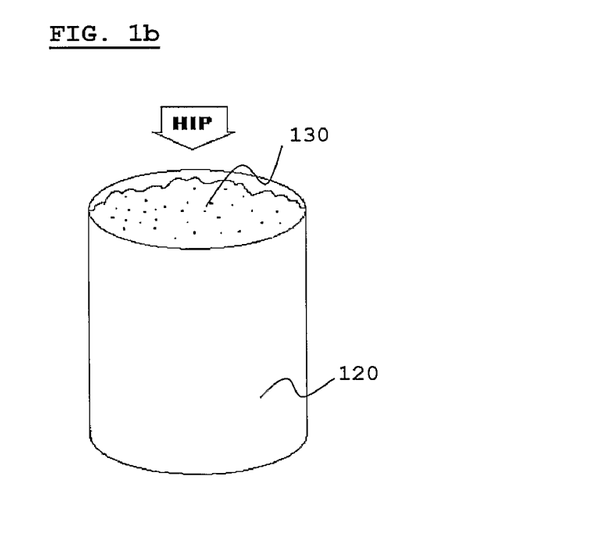

Next, as in FIG. 1b, HIP is performed on the entire assembly. In a particularly preferred embodiment, this is a two-stage HIP process. It will be appreciated that performing the HIP process in two or more stages ensures minimal infiltration of copper into magnetic material and magnetic material into copper before the magnetic material is sufficiently internally bonded.

Finally, unneeded support members are machined off the rotor structure.

In a further embodiment, the conductive bars of a rotor cage are positioned in the mold together with powdered magnetic material, and the conductive end rings of the cage, which are to stick out of the magnetic portion in this embodiment, are added after the HIP stages are complete.

In a further embodiment, both the magnetic material and the electrical cage of a rotor may be formed of pressed powder. In this embodiment, powdered magnetic material and powdered conductive material are provided. The magnetic powder and conductive powder are arranged in their desired positions in a mold, and HIP is applied. The conductive material may be formed within the mold inside an insulating support structure, such as a tube, and HIP is applied. In a further preferred embodiment, the magnetic powder and the conductive powder may be suspended in binders, the binders functional to deposit the powders, layer by layer, in their desired positions.

It will be noted that components formed using HIP as disclosed above may be used in conjunction with other components formed by conventional means, such as lamination. For example, an electrical rotating machine may include a rotor formed by HIP, as in FIGS. 1a-1b, and a stator formed by lamination.

In a further embodiment, a stator is produced by an HIP process. Preferably a layer of insulation is added between the magnetic portion and the electrically conductive portion of the stator. The magnetic portion, insulation, and copper conductors are bonded together in the HIP process, which may be done in one or several stages.

Figure 2A:
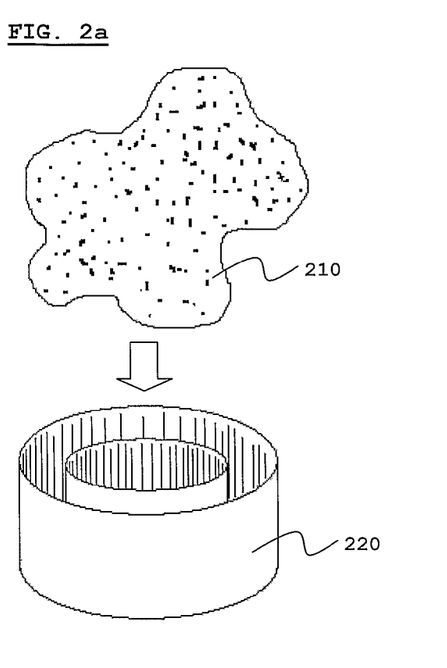
FIGS. 2a-2d are a simplified illustration of a method of producing a toroidal stator in several stages in accordance with a preferred embodiment of the current invention.
Figure 2B:
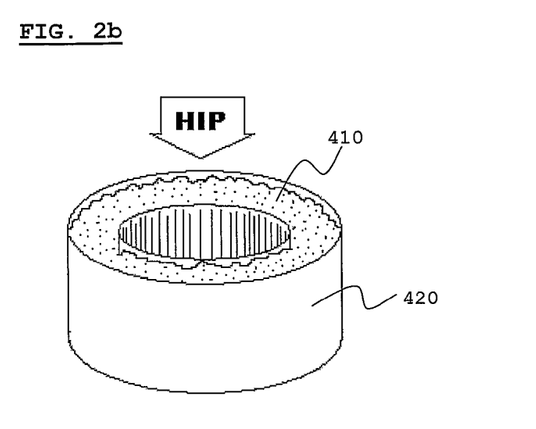
Figure 2C:
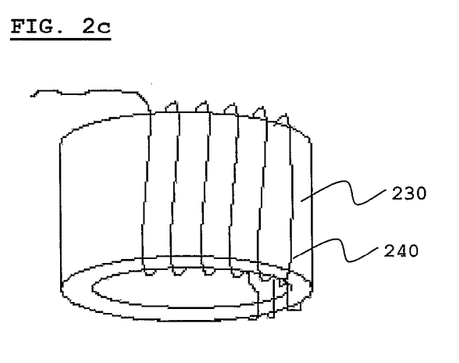
Figure 2D:
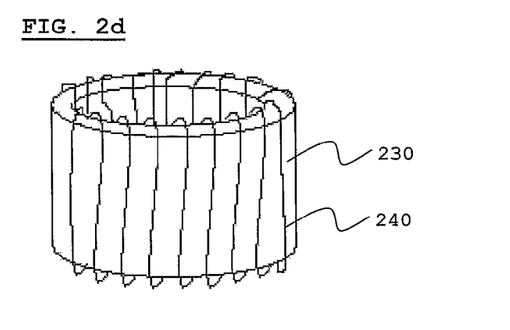

In a preferred embodiment, as in FIGS. 2a-2d, a toroidal stator is produced in several stages, consisting of the following. First, as in FIG. 2a, a magnetic powdered material 210 and a mold 220 are provided. In the next step, as in FIG. 2b, magnetic powder 210 is positioned within mold 220 and HIP is applied to the magnetic powdered material to compact and harden it to predetermined dimensions. In FIG. 2c, after the hardened magnetic material 230 is removed from mold 220, insulated electrically conductive material 240 is provided and is positioned on hardened magnetic material 230 in a position suitable to form various winding phases. The completed toroidal stator is shown in FIG. 2d. The HIP procedure may contain several stages.

Figure 3A:
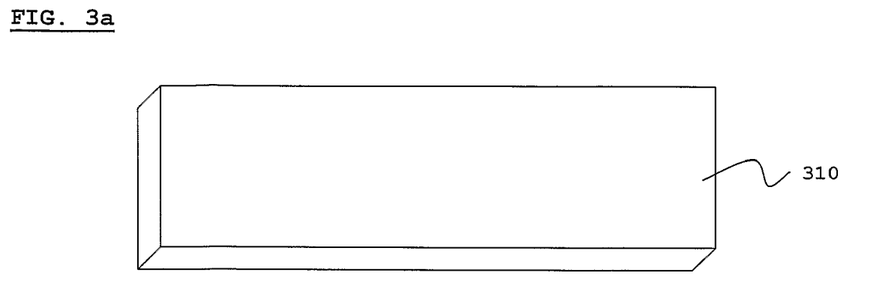
FIGS. 3a-3d show a toroidal stator built in stages: first pressed into a rectangle, then wound, and then rolled into a ring.
Figure 3B:
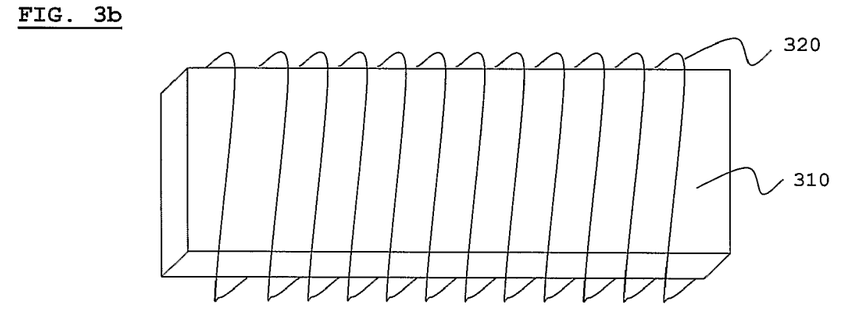
Figure 3C:
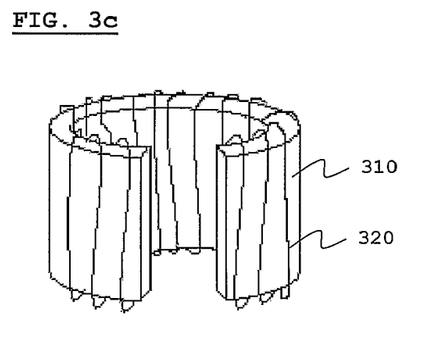
Figure 3D:
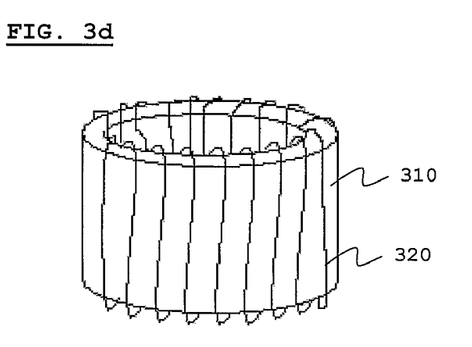

In a further embodiment, as shown in FIGS. 3a-3d, a stator is first formed flat, possibly by HIP, and then rolled into a toroid or an open-ended cylinder. As seen in FIG. 3a, magnetic material is formed into a flat bar 310. In FIG. 3b, windings 320 of insulated electrically conductive material are positioned around bar 310. In FIG. 3c, the assembly is rolled into a ring. In FIG. 3d, the ring is sealed to form a toroidal stator. This design may be used both when the stator winding is to be on the cylinder interior and when the stator winding is wound around the interior and exterior of a toroidally shaped stator. This design enables the windings to be wound before the two sides of the stator are rolled and attached together to form a cylinder or toroid. The benefits of winding onto a flat stator instead of poking windings through the confined area within a circular stator include the enabling of a high packing density, and greatly simplified winding procedure. With a high phase order machine, or a high pole count machine, the simplified winding procedure is significant. Another embodiment is to initially construct the cylindrical or toroidal stator as a 'C' shape, ie almost a full circle (as in FIG. 3c), then wind the windings, and then close the circle (as in FIG. 3d). Stator teeth may be added at any stage, or at the end, may be pressed closed to fully encircle the stator windings, possibly using HIP.

Figure 4A:
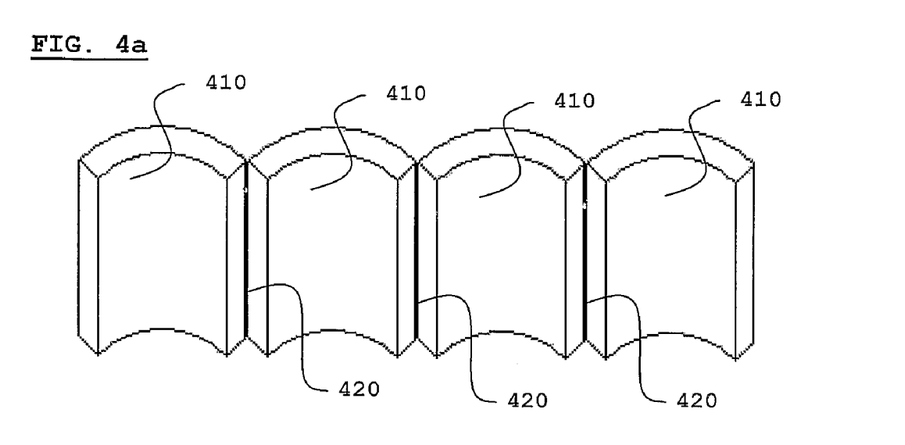
FIGS. 4a-4c show a simplified illustration of an assembly procedure for a segmented toroidal stator.
Figure 4B:
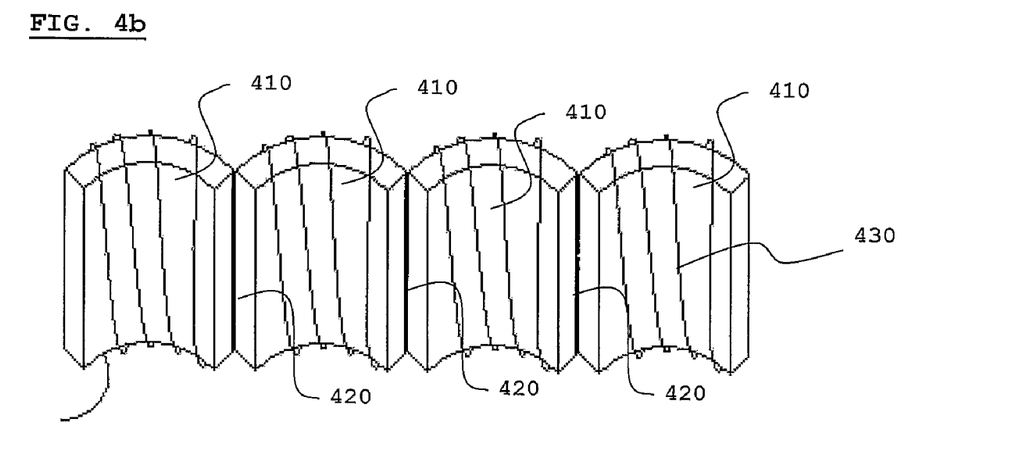
Figure 4C:
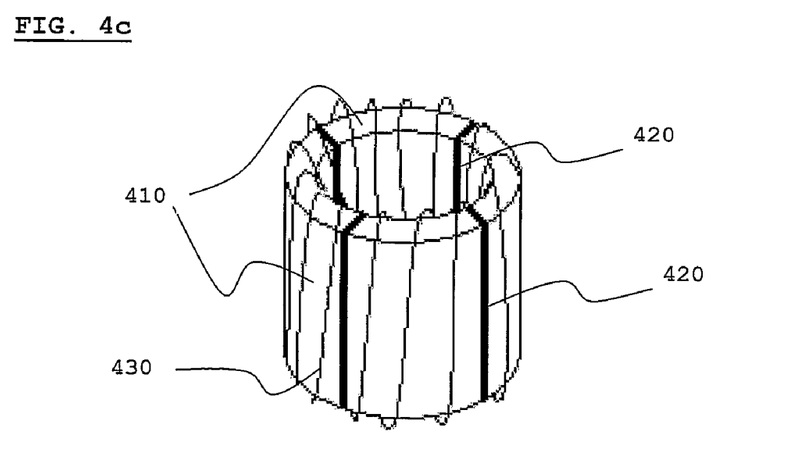

In still another preferred embodiment, as in FIGS. 4a-4c, the stator could be formed in a plurality of rigid segments 410, each segment possibly formed by HIP. The segments are hingedly attached at joints 420, as in FIG. 4a. When stator segments are open, windings 430 may be wound easily, as in FIG. 4b. When assembly of windings is done, segments 410 may be rolled to form a small cylinder shape, as in FIG. 4c. In a still further embodiment, the stator may be formed of only two rigid segments—a main body and one hinged sector functional to open the stator body to enable winding work space, then seal the stator body for operation.

Figure 5A:
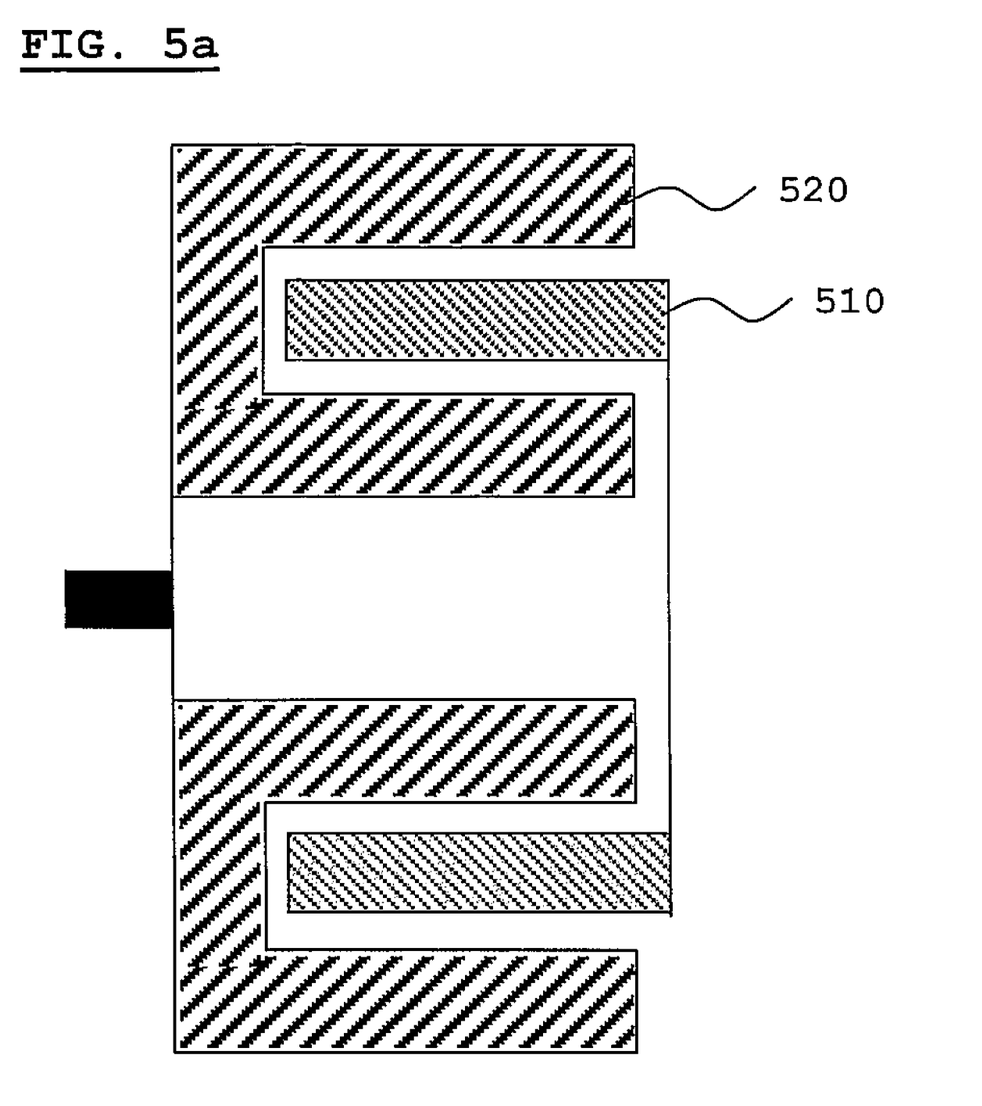
FIGS. 5a and 5b are respectively a cross-sectional schematic view and a simplified exploded view of a motor having a dual rotor in accordance with a preferred embodiment of the current invention.
Figure 5B:
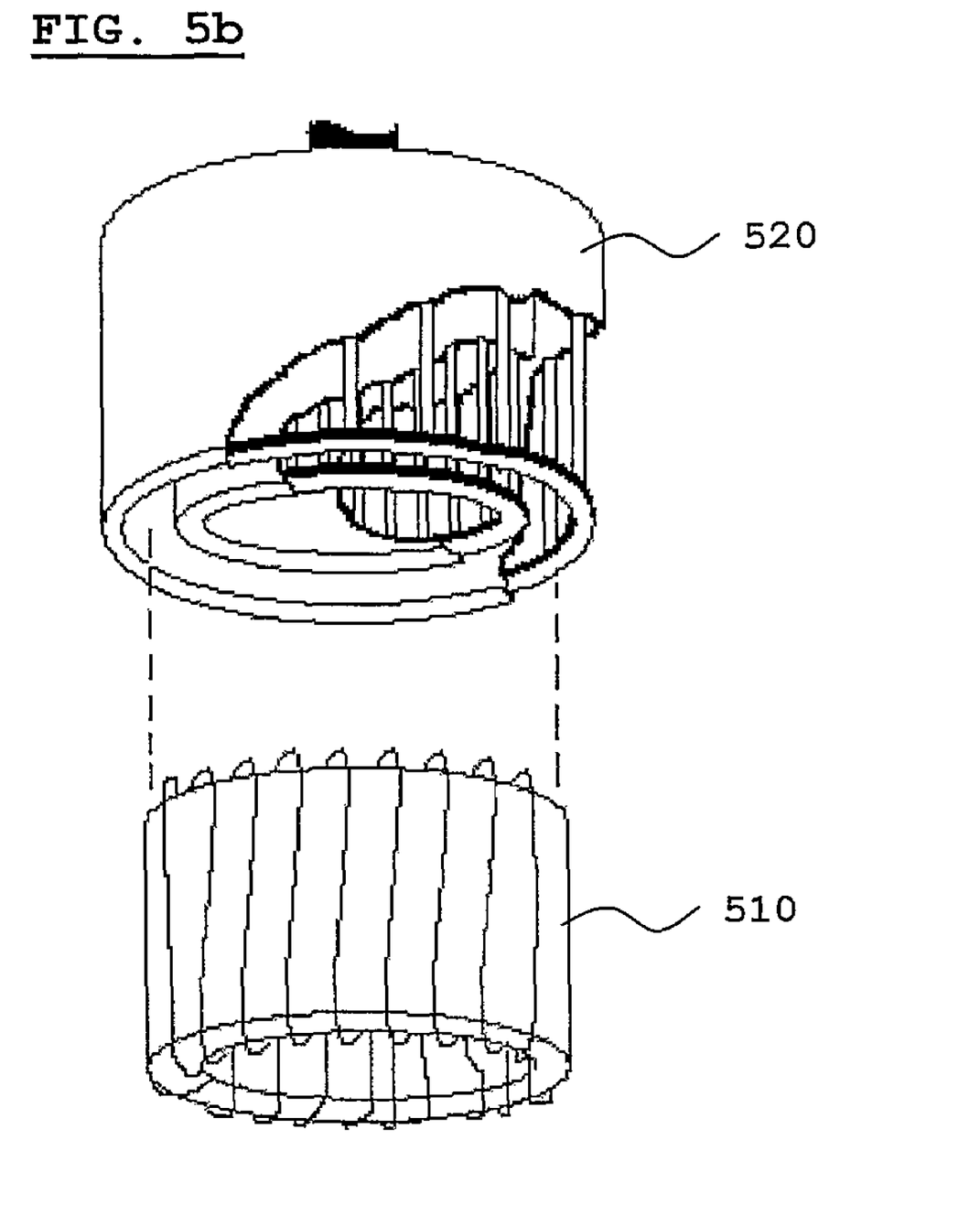

In a further embodiment, as in FIGS. 5a-b, a toroidal stator 510 is used, as described above, and a double rotor 520 configuration is produced from pressed powder as described above. Rotor 520 is formed of two parts, one facing the inside and one facing the outside of toroidal stator 510, such that the cross-section of rotor 520 has a C shape. The two parts of rotor 520 are connected to one another at one end, possibly with insulation between them if necessary to protect against incorrect current flow. In this way, the electrical current of the stator windings is used to maximum advantage. The end turns of wire would otherwise be wrapped around the outside of the stator, carrying current but not contributing to the motion of the rotor.

In a further embodiment, the magnetic portions of the stator and rotor are formed together as a single unit, such that they rotate in unison. Electrical insulation may be added between the stator and rotor portions, to prevent current flow or magnetic flux between stator and rotor. The stationary stator windings would need to be separately supported.

The components produced by any of the embodiments disclosed above may advantageously employed in the construction of high phase order rotating induction machine. Preferably the induction machine is connected to a suitable high phase order inverter via a mesh connection as disclosed above, which allows the machine to behave as a variable pole count device with advantageous benefits, particularly where the device is a motor in which the V/Hz ratio may be easily changed and thereby the operating torque. Thus a V/Hz ratio providing high torque at low speed may be selected for moving from rest the vehicle to which the wheel is attached, and a different ratio selected that is capable of running at high speed when the vehicle is motoring.

For a high phase order machine, where N is more than three, the windings may each be driven with a full bridge inverter connection. An alternative configuration is with inverter half bridges, where the windings are connected to the inverter drive with a star or a mesh connection. For a star connection, each machine phase is connected to one inverter terminal and to a common point, preferably of zero voltage relative to earth. For a mesh connection, the machine is connected to the inverter terminals so that each machine phase is electrically connected to a first inverter terminal and to a second inverter terminal that is L inverter terminals distant from the first inverter terminal, in order of electrical phase angle (L is the span number). The phase angle difference between the pair of inverter terminals to which each machine phase is connected is identical for each machine phase.

When a mesh connected machine is driven with drive waveform of different harmonic orders, the V/Hz ratio and the impedance of the machine varies in accordance with the harmonic order. The harmonic mesh effect is described in greater detail in U.S. Pat. No. 6,657,334. The V/Hz ratio and the impedance also depend upon the number of phases and the span of the mesh connection between the inverter and the rotating machine.

In a further embodiment, the stator windings are arranged toroidally. The windings are wound around the interior and exterior of the toroid, to form a continuous loop. Inverter phases are attached at equidistant intervals to form a delta connected winding, or if there are more than three phases, a mesh connection with a span L=1. This is the high phase order equivalent of the three phase delta connection. The end turns are significantly reduced with this design. Toroidal stators are further discussed in WIPO application WO06065988 published on Jun. 22, 2006.

INDUSTRIAL APPLICABILITY

Components, particularly the rotor, manufactured by HIP are particularly suited for use with a high phase order machine. A reason why lamination is selected over HIP as a manufacturing process for electrical rotating machines is that laminated materials help to reduce eddy current losses. As eddy current losses are proportional to frequency, and the rotor ideally sees only low frequency rotating magnetic fields because it rotates in synchrony with the magnetic field, rotors do not need to be made by lamination, and may be made by HIP in order to realize the benefits of strength, consistent grain structure, and dimensional accuracy. On the other hand, any harmonic rotating magnetic fields show up as high frequencies to the rotor, again presenting the threat of high eddy current losses. A high phase order machine synchronizes the harmonics, reducing eddy current losses and making HIPed rotors more viable.

The invention claimed is:

1. A method for building a component comprising a stator or rotor with a magnetic portion and an electrically conductive portion for an electrical rotating machine, comprising the steps of:
   (a) providing a powder of a magnetic material to form a magnetic portion of a stator or rotor;
   (b) providing an uninsulated electrically conductive material to form an electrically conductive portion of a stator or rotor;
   (c) determining a configuration and dimensions for a stator or rotor component of an electrical rotating machine;
   (d) positioning said powder of magnetic material and said uninsulated electrically conductive material within a mold functional to provide said materials with said dimensions of said stator or rotor after application of a hot isostatic pressing (HIP) procedure so that the magnetic powder and the uninsulated electrically conductive material are in direct contact; and
   (e) applying at least one HIP procedure to said powder of magnetic material and said uninsulated electrically conductive material in said mold, thereby simultaneously forming the magnetic portion of said stator or rotor and bonding the magnetic portion of said stator or rotor directly to the electrically conductive portion of said stator or rotor.

2. The method of claim 1 in which said stator may be internal to or external to said rotor.

3. The method of claim 1 in which said HIP procedure is characterized by application of high pressure and high temperature for a period of time sufficient to simultaneously form the magnetic portion of said stator or rotor and bond the magnetic portion directly to the electrically conductive portion of said stator or rotor.

4. The method of claim 3 wherein said HIP procedure comprises two stages, a first stage characterized by application of a first temperature and a second stage characterized by application of a second temperature.

5. The method of claim 4 wherein said first temperature is lower than said second temperature.

6. The method of claim 1 wherein said magnetic material is an alloy of iron and other materials selected for superior magnetic properties.

7. The method of claim 6, wherein said other materials include cobalt and vanadium.

8. The method of claim 6, wherein said other materials include cobalt and chromium.

9. The method of claim 1 wherein said electrically conductive material is selected from the group consisting of: copper, silver and aluminum.

10. The method of claim 1 comprising determining a configuration and dimensions for a rotor, and providing said electrically conductive material in the form of a powder.

11. The method of claim 1 comprising determining a configuration and dimensions for a stator having a toroidal shape.

12. A method for building a component of an electrical rotating machine, comprising the steps of:
   (a) providing a powder of a magnetic material;
   (b) providing electrically conductive material;
   (c) determining dimensions for a motor component;
   (d) positioning said powder of magnetic material and said electrically conductive material within a mold functional to provide said materials with said dimensions after application of a hot isostatic pressing (HIP) procedure; and
   (e) applying at least one HIP procedure to said powder of magnetic material and said electrically conductive material in said mold, wherein said component is a rotor having a substantially cylindrical body, and said electrically conductive material is provided in the form of a squirrel cage characterized by: two electrically conductive rings coaxial with said cylindrical body, and a plurality of electrically conductive bars extending from one ring to the other ring and attached thereto, said bars being parallel to and equidistant from said axis and said bars being equally spaced therebetween.

13. A method for building a component of an electrical rotating machine, comprising the steps of:
   (a) providing a powder of a magnetic material;
   (b) providing electrically conductive material;
   (c) determining dimensions for a motor component;
   (d) positioning said powder of magnetic material and said electrically conductive material within a mold functional to provide said materials with said dimensions after application of a hot isostatic pressing (HIP) procedure; and
   (e) applying at least one HIP procedure to said powder of magnetic material and said electrically conductive material in said mold, wherein said component is a rotor having a substantially cylindrical body, said electrically conductive material is provided in the form of a plurality of electrically conductive bars, and said bars are positioned within said mold so as to be parallel to and equidistant from the central axis of said cylindrical body and so as to be equally spaced therebetween.

14. A method for building a component of an electrical rotating machine, comprising the steps of:
   (a) providing a powder of a magnetic material;
   (b) providing electrically conductive material;
   (c) determining dimensions for a motor component;
   (d) positioning said powder of magnetic material and said electrically conductive material within a mold functional to provide said materials with said dimensions after application of a hot isostatic pressing (HIP) procedure; and
   (e) applying at least one HIP procedure to said powder of magnetic material and said electrically conductive material in said mold, wherein said component is a rotor having two sections, the two rotor sections having substantially cylindrical bodies, the cylindrical bodies being coaxial and being rigidly connected together, and wherein said rotor is adapted to be used with a stator having a substantially cylindrical shape and having windings wound toroidally around the interior and exterior of said stator, such that the first rotor section is internal to said stator and faces said interior windings and the second rotor section is external to said stator and faces said exterior windings.

15. A method for building a component of an electrical rotating machine, comprising the steps of:
   (a) providing a powder of a magnetic material;
   (b) providing electrically conductive material;
   (c) determining dimensions for a motor component;
   (d) positioning said powder of magnetic material and said electrically conductive material within a mold functional to provide said materials with said dimensions after application of a hot isostatic pressing (HIP) procedure; and
   (e) applying at least one HIP procedure to said powder of magnetic material and said electrically conductive material in said mold, wherein said component is a component of an electrical induction machine and said electrical induction machine is adapted to be driven by a polyphase inverter supplying N phases of alternating current, where N is greater than 3, each phase electrically connected to at least one terminal of said inverter, and wherein the stator of said electrical induction motor comprises N phase windings, each of said phase windings being connected to said inverter terminals.

16. The method of claim 15, wherein said N phase windings are mesh connected to said inverter terminals, said mesh characterized in that:
   (a) each phase winding is electrically connected to a first inverter terminal and a second inverter terminal S skipped terminals distant from said first inverter terminal in order of electrical phase angle, where S is the skip number and represents the number of skipped terminals; and
   (b) the phase angle difference between the two inverter terminals to which each machine phase is connected is identical for each machine phase.

17. The method of claim 16, wherein said inverter comprises means to change the harmonic frequency of said polyphase alternating current in order to vary the impedance of said induction machine, thereby varying the V/Hz ratio of said motor.

18. The method of claim 15 wherein said machine is located within the drive wheel of a vehicle.

19. The method of claim 18 wherein said vehicle is an aircraft.

20. The method of claim 15 wherein said machine is selected from the group consisting of a motor and a generator.

* * * * *